(12) United States Patent
Hvittfeldt et al.

(10) Patent No.: US 6,419,211 B1
(45) Date of Patent: Jul. 16, 2002

(54) MANIPULATOR AND METHOD FOR MANUFACTURING THE MANIPULATOR

(75) Inventors: Hakan Hvittfeldt; Jan Larsson; Pierre Mikaelsson; Fredik Persson, all of Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/831,638

(22) PCT Filed: Nov. 9, 1999

(86) PCT No.: PCT/SE99/02027

§ 371 (c)(1),
(2), (4) Date: Jun. 20, 2001

(87) PCT Pub. No.: WO00/27597

PCT Pub. Date: May 18, 2000

(30) Foreign Application Priority Data

Nov. 11, 1998 (SE) .............................................. 9803881

(51) Int. Cl.$^7$ ................................................ B25J 17/02
(52) U.S. Cl. .............................. 267/69; 267/71; 267/72; 267/74; 267/136
(58) Field of Search ............................. 267/69, 70, 71, 267/72, 73, 74, 136; 414/729, 735, 744.6, 744.5, 744.4, 736; 294/106–119; 901/27–29, 48, 50; 248/278.1, 284.1

(56) References Cited

U.S. PATENT DOCUMENTS

| | | | |
|---|---|---|---|
| 1,583,806 A | * | 5/1926 | Snyder .......................... 267/71 |
| 2,774,488 A | * | 12/1956 | Goertz et al. |
| RE26,417 E | * | 6/1968 | Kaplan |
| 4,329,110 A | | 5/1982 | Schmid |
| 4,537,557 A | * | 8/1985 | Whitney ...................... 414/735 |
| 4,592,697 A | * | 6/1986 | Tuda et al. .................... 267/71 |
| 4,681,303 A | * | 7/1987 | Grassano ...................... 267/70 |
| 4,976,582 A | | 12/1990 | Clavel |
| 5,294,162 A | * | 3/1994 | Grimes .................... 294/110.1 |
| 5,333,514 A | | 8/1994 | Toyama et al. |
| 5,476,357 A | * | 12/1995 | Arai ............................ 414/729 |
| 5,901,993 A | * | 5/1999 | Lowery et al. |
| 6,095,011 A | * | 8/2000 | Brogardh ................. 74/490.03 |

FOREIGN PATENT DOCUMENTS

JP 9-19883 * 1/1997

OTHER PUBLICATIONS

Abstracts of Japan, Matsushita Electric Ind. Co. Ltd., Articulated Industrial Robot, vol. 15, No. 42, M–1076 abstract of JP 2–279295A, Nov. 15, 1990.

* cited by examiner

Primary Examiner—Douglas C. Butler
(74) Attorney, Agent, or Firm—Dykema Gossett PLLC

(57) ABSTRACT

A manipulator comprising a linkage with at least two links (1, 4) which have ball joints (3, 6) at their ends, and a spring device (10) which exerts a tensile force between the links. The spring device (10) comprises a first drawing device (11) with a first angle device (18), a second drawing device (12) with a second angle device (19), which are arranged, displaceable in parallel, side-by-side, and a spring member (13) arranged between the angle devices. The tensile force arises by the spring member exerting a compressive force against the angle devices.

6 Claims, 1 Drawing Sheet

US 6,419,211 B1

MANIPULATOR AND METHOD FOR MANUFACTURING THE MANIPULATOR

TECHNICAL FIELD

The invention relates to a manipulator which, with the assistance of a control unit, forms an industrial robot for primarily picking purposes. In particular, the invention relates to a manipulator with three arms by means of which a movable member, comprised in the manipulator, is brought to arbitrary positions in space with retained orientation and inclination.

BACKGROUND ART

An industrial robot comprises a manipulator and control equipment, whereby the manipulator with the assistance of the control equipment carries out arbitrary operations within a working range. Usually, such a manipulator comprises a plurality of arms which support a hand, on which a tool is arranged. In the majority of robot applications, a traditional six-axis manipulator is used, which exhibits sufficient movability to carry out a wide range of operations with mostly very high accuracy. For certain applications, however, there is a need of a manipulator which has fewer degrees of freedom but which permits faster operations. Such a manipulator may be mechanically connected in such a way that the tool-carrying hand is all the time oriented in space in a predetermined manner.

From U.S. Pat. No. 4,976,582 a manipulator is previously known by means of which a movable element in relation to a stationary element may be moved in a space with retained orientation and retained inclination. The manipulator has three arms which jointly support the movable element. Each of these arms is rotatably journalled in the stationary element around a respective first axis. The arm supports a linkage, one end of which is rotatably journalled in the outer part of the arm, allowing a movement in two degrees of freedom. In its other end, the linkage supports the movable element and is journalled therein, allowing a movement in two degrees of freedom.

The linkage comprises two parallel links and is arranged, together with the arm, such that one of the degrees of freedom of each end of the linkage constitutes a rotation around an axis which is parallel to the first axis of the respective arm. Irrespective of the movements of the arm or the linkage, these three axes of rotation are thus kept in parallel. In this way, the movable element will always have the same orientation and inclination Win relation to the stationary element. One condition, however, is that the respective first axes of the arms form an angle with each other.

According to the known manipulator, the parallel links are attached with one of their ends to the respective arm and with their other end to the movable element by means of either a so,called universal joint or a pivot. A universal joint offers a movement in two degrees of freedom. A pivot, in the following text, is to be understood as a centre-point bearing. Such a bearing fixes two objects to each other with three degrees of freedom. It thus provides a tilting movement in two directions while at the same time providing rotation. A common embodiment of a pivot is a so-called ball joint, which is a bendable and turnable connect-ion between two objects, for example links. The end of one of the links is thus formed as a ball, which for the most part is surrounded by a cup in the end of the other link.

Two parallel links with pivot attachment offer a movement with two degrees of freedom. A single link with a universal joint also offers a movement with two degrees of freedom although the accuracy in the movement becomes greatly deteriorated. Providing two parallel links with a universal joint each thus results in the system becoming overdetermined. This may result in stresses which wear on the bearings. Parallel links with pivot attachment are thus preferable.

To increase the movability of the manipulator, in a ball-cup bearing, the actual cup must be arranged with a small spherical extent. However, if the cup is arranged to be smaller than half a sphere, the joint can no longer keep together. An external force must then all the time press the ball and the cup against each other such that the joint is capable of transferring compressive and tensile forces without any play arising. In this context, U.S. 5,333,514 teaches a manipulator comprising parallel links, between each pair of which a spiral spring is arranged. The two links each comprises a cup, which cups are facing each other and are each adapted to fit over a respective ball. The tensile force between the parallel links, arising through the spiral spring, then ensures that the ball and the cup are in contact with each other with such a force that the cup does not jump off the ball at accelerating movements.

The known spiral spring, which in this way exerts a tensile force, has proved to have limited strength. The hooks, arranged at the ends of the springs, are subjected to such repeated load changes that fatigue causes fracture. Further, the known spring, in order to be placed in position, must be stretched out and then hooked on. It then often happens that this stretching results in the yield point of the material being passed, whereby the resilient properties are deteriorated such that the spring must be rejected. A further disadvantage with the known spring, in connection with operations in a hygienically sensitive environment, is that the spiral spring attracts dust and particles which are difficult to clean away.

SUMMARY OF THE INVENTION

The object of the present invention is to suggest ways and means of manufacturing a manipulator of the kind described above, which comprises a spring device which exhibits improved strength and reduced risk of elongation. From a second aspect, the spring device shall also have a reduced tendency to attract dust and, in addition, be easy to clean and thus useful for operations with high hygienic requirements.

These objects are achieved according to the invention by a manipulator according to the characteristic features described in the characterizing portion of the independent claim 1 and with a method according to the characteristic features described in the characterizing portions of the independent claims 6 and 7. Advantageous embodiments are described in the characterizing portions of the dependent claims.

According to the invention, the tensile force between the parallel links of a manipulator of the kind described above is provided by a spring device where the spring force is obtained by compressing a spring instead of stretching it out, as is known. This is attained by allowing two rods provided with pistons to cross each other and arranging a spring between the pistons. When applying a tensile force between the free ends of the rod, the two pistons are moved towards each other, the spring arranged between the pistons thus being tensioned by compression. One of the rods may equally be replaced by a clamp means surrounding the spring. Any member exhibiting a spring force corresponding to pressure may be arranged as a spring.

According to a first aspect of the invention, the spring device comprises a sleeve-shaped housing in which a spiral spring is arranged. At one end the housing is open, and at the other end it is provided with a bottom, against which the spiral spring rests. In its open end, the housing is provided with a fixing device for attachment to one of the parallel links. A rod provided with pistons is arranged through the housing and the spring and penetrates the sealed end of the housing. The free end of the rod is arranged with a fixing device for attachment to the other parallel link. During mounting, the two fixing devices are pulled from each other, whereby the spiral springs are brought to be compressed between the piston and the bottom of the housing. The compressed spiral spring thus exerts a compressive force between the piston and the bottom of the housing, which is transformed into a tensile force in that the housing and the rod cross each other. The spiral spring may be dimensioned such that there is no risk of the spring material exceeding the so-called yield point, where the material loses its elastic properties.

In a preferred embodiment, the sleeve-shaped material is sealed also in its other end. In this embodiment the spiral spring is completely enclosed in the housing, whereby no dirt may accumulate in the spring. In this embodiment the housing is formed with smooth external surfaces and without dirt-attracting folds or pockets such that it may be easily flushed.

BRIEF DESCRIPTION OF THE DRAWING

The invention will be explained in greater detail by description of an embodiment with reference to the accompanying drawing, wherein.

DESCRIPTION OF THE PREFERRED EMBODIMENT

Figure 1:
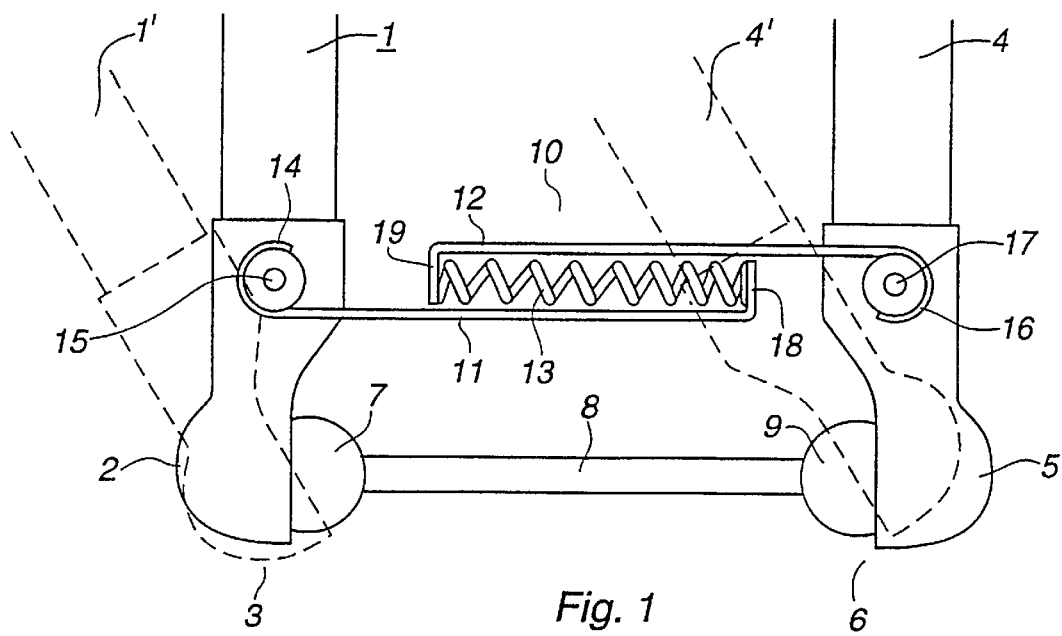
FIG. 1 shows one end of a linkage of a manipulator wherein a spring device according to the invention is arranged between two parallel links.

One end of a linkage of a manipulator (not shown) is shown in FIG. 1. A first link 1 comprises a first cup-shaped part 2 of a first ball joint 3. A second link 4 comprises a second cup-shaped part 5 of a second ball joint 6. A first ball 7 is arranged at a movable element 8 and is in engagement with the first cup-shaped part 2. The first ball and the first cup-shaped part form the first ball joint 3 which allows the first link 1 to move with three degrees of freedom. A second ball 9 is arranged at the movable element 8 and is in engagement with the second cup-shaped part 5. The second ball and the second cup-shaped part form the second ball joint 6 which allows the second link 4 to move with three degrees of freedom. The two links are adapted to move, through the ball joints, in parallel to a second position, here designated 1' and 4', respectively. Since the links in a similar manner are attached to their ends and move with the links permanently in parallel, the arrangement as a whole allows a rotational movement with two degrees of freedom only.

Between the first link and the second link there is arranged a spring device 10 which exerts a tensile force between the first link 1 and the second link 4. The spring device comprises a first drawing device 11 and a second drawing device 12 as well as a spring member 13. In the example shown, the drawing device is exemplified by a rod and the spring member by a spiral spring. The drawing devices are arranged side-by-side with their respective directions of extension in parallel with each other and displaceable in this direction. At one end, the first drawing device 11 has a first fixing member 14 which is connected to the first cup-shaped part 2 via a first connection device 15 which permits a rotational movement around an axis perpendicular to the direction of extension of the drawing device. At one end, the second drawing device 12 has a second fixing member 16 which is connected to the second link 4 via a second connection device 17 which permits a rotational movement around an axis perpendicular to the direction of extension of the drawing device. At its other end, the first drawing device 11 comprises a first angle device 18, with which one end of the spring member 13 makes contact. The second drawing device comprises, in its other end, a second angle device 19, with which the other end of the spring member 13 makes contact.

When tensioning the spring device 10, the first fixing member 14 and the second fixing member 16 are pulled away from each other and connected to the respective connection device 15, 17. By pulling away the fixing members in this way, the spring member 13 will be compressed between the respective angle device 18, 19 of the drawing device 11, 12. The drawing devices arranged in this way thus permits a compressive force, caused by a spring member, to be transferred to a tensile force acting between the links. The spiral spring shown in the example contains no sharp bends which may give rise to fatigue breakdown. Since the spring acts by compression, the spring cannot be deformed by mistake such that the material in the spring is brought to exceed the yield point.

Figure 2:
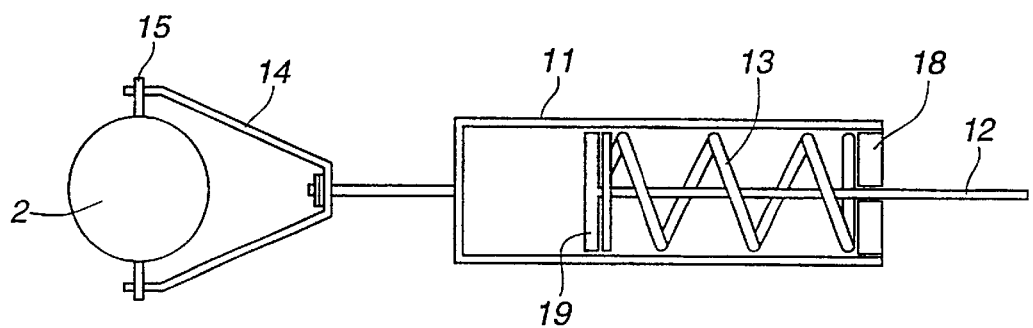
FIG. 2 shows a fundamental embodiment of a spring device.

Another embodiment of the spring device is shown in FIG. 2. A first drawing device 11 in the form of a sleeve-shaped housing surrounds a spring member 13, which in the example shown is a spiral spring. The housing has an angle device 18 in the form of an end member, through which a second drawing device 12 passes. In the example shown, the second drawing device is formed as a rod and its angle device 19 as a piston running in the sleeve-shaped housing. The spiral spring 13 is arranged between the piston 19 and the end member 18, whereby the rod 12 extends through the spring. The housing 11 is sealed in its other end and connected to a fixing member 14, which in the example is a clamp with hooks. These hooks are hooked onto a coupling device which in the example is in the form of two pins extending from the cup-shaped part 2.

The spring device shown in the example permits the spiral spring to be accommodated in the housing. In this way, the spring is protected against mechanical damage. The enclosure also prevents the spring from attracting dirt which may be difficult to remove. Because of the housing, the surfaces of the spring device will, in all essentials, be smooth and capable of being flushed, so the spring device may advantageously be used in working environments with high hygienic demands.

Figure 3:
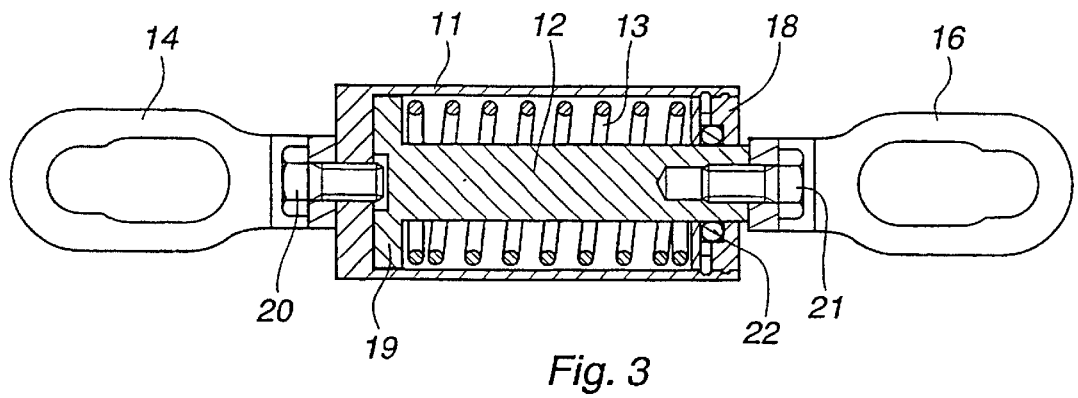
FIG. 3 shows a preferred embodiment of a spring device.

FIG. 3 shows an additional preferred embodiment of the spring device. In all essentials, the example shows a version of the spring device according to example 2, adapted for production. A sleeve-shaped housing 11, open at one end, accommodates a spiral spring 13. A bar 12 with a piston 19 extends through the housing and the spring. The opening of the housing is sealed by an end member 18, whereby the spring, which may be prestressed, is arranged between the piston and the end member. A first fixing member is attached to the housing 11 by a screw device 21. An O-ring placed at the end member permits the bar to extend without dirt penetrating into the housing. The spring device shown is completely flushable and thus exceedingly useful in environments with hygienic demands.

The invention is not limited to the embodiments shown but also other configurations, where a tensile force is obtained by compression of a spring member, are possible. Thus, one of the drawing devices may be for med, for example, as a clamp with surrounds the spring member. The spring member may also, with retained function, consist of, for example, a rubber block or another resilient body built up of, for example, a lattice structure. The spring member may also be a gas spring. Likewise, the spiral spring shown may be designed of steel as well as other elastic materials.

What is claimed is:

1. A manipulator including a linkage with at least two links having ball joints at their ends, and a spring device which exerts a tensile force between the links, wherein the spring device comprises a first drawing device with a first angle device, a second drawing device with a second angle device, the first and second devices being arranged, displaceable in parallel, side-by-side, and a spring member arranged between the angle devices, the tensile force arising by the spring member exerting a compressive force against the angle devices.

2. A manipulator according to claim 1, wherein the first drawing device comprises a sleeve-shaped housing and the first angle device comprises an end member associated with the housing, the housing e closing the spring member.

3. A manipulator according to claim 2, wherein the second drawing device comprises a bar and the second angle device comprises a plate fixed to the bar, the spring member surrounding the bar and making contact with the plate.

4. A manipulator according to claim 1, wherein the spring member comprises a spiral spring.

5. A method for manufacturing a manipulator including a linkage with at least two links having ball joints at their ends, and a spring device which exerts a tensile force between the links, comprising the steps of providing the spring device as a first drawing device which is provided with a first angle device, and a second drawing device which is provided with a second angle device, arranging a spring member between the angle devices, and arranging the first drawing device and the second drawing device as displaceable, in parallel, side-by-side such that the tensile force is provided by the spring member exerting a compressive force against the angle devices.

6. A method for manufacturing a manipulator according to claim 5 characterized in that the first drawing device (11) is brought to comprise a sleeve-shaped housing, that the first angle device (18) is brought to comprise an end member for the housing, the spring member being enclosed by the housing and being, brought to rest against the bottom.

* * * * *